Dec. 8, 1953  W. D. BUCKINGHAM  2,662,196
CONCENTRATED ARC LAMP
Filed Nov. 4, 1948  2 Sheets-Sheet 1
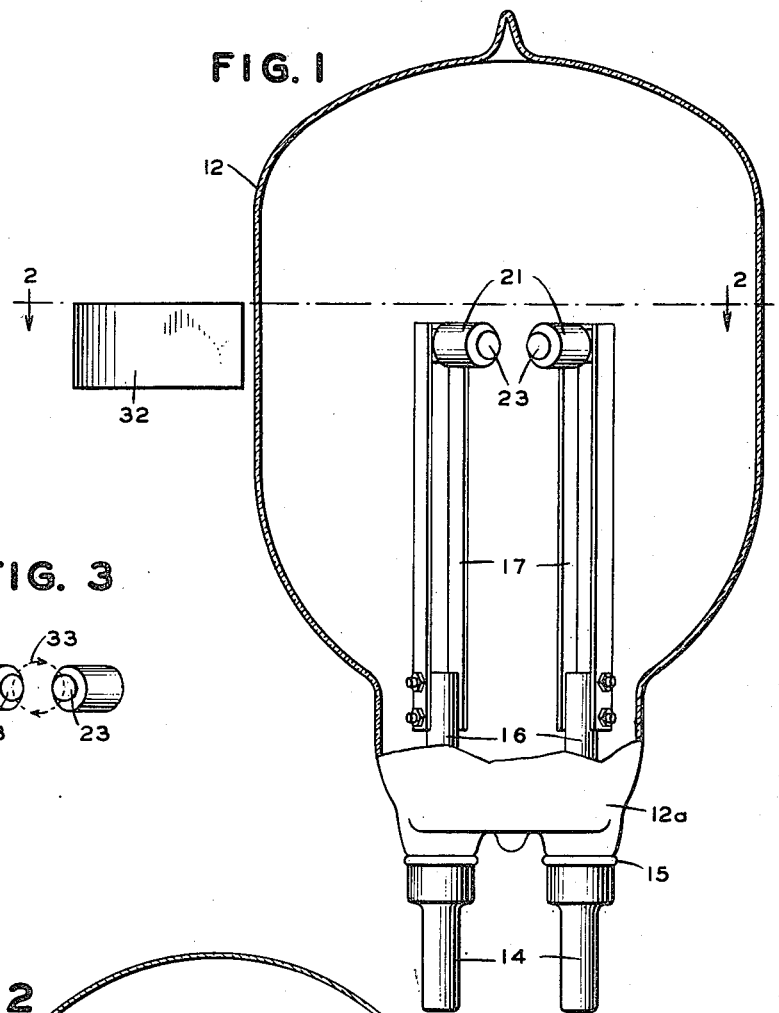
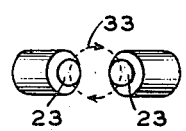
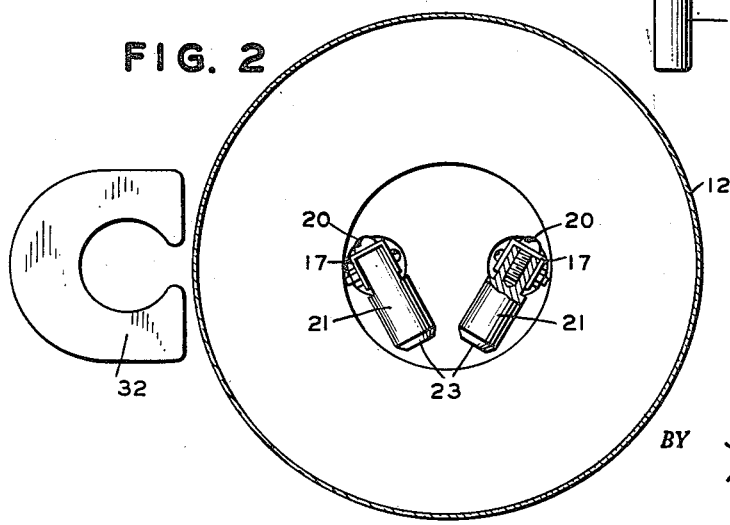
INVENTOR.
W. D. BUCKINGHAM
BY
ATTORNEY Dec. 8, 1953   W. D. BUCKINGHAM   2,662,196
CONCENTRATED ARC LAMP Filed Nov. 4, 1948   2 Sheets-Sheet 2

INVENTOR.
W. D. BUCKINGHAM
BY
ATTORNEY

Patented Dec. 8, 1953

2,662,196

UNITED STATES PATENT OFFICE 2,662,196

CONCENTRATED ARC LAMP

William D. Buckingham, Southampton, N. Y., assignor to The Western Union Telegraph Company, New York, N. Y., a corporation of New York Application November 4, 1948, Serial No. 58,291

4 Claims. (Cl. 313—161)

This invention relates to an arc discharge lamp in which the cathode has an active fused surface film that is formed and rendered highly incandescent by an arc of high current density that is concentrated thereon when the device is in operation and which produces a concentrated source of white light of high intrinsic brilliance, and more particularly to an improved flood lamp or spotlight for photographic and projection purposes. The arc discharge lamp is of the type disclosed in the Buckingham and Deibert Patent No. 2,453,118, issued November 9, 1948, the disclosure of which is incorporated herein by reference, and the instant invention relates to certain improvements in the lamp disclosed in my aforesaid joint patent, and also represents improvements over the concentrated arc discharge lamp disclosed in my Patent No. 2,543,227, issued February 27, 1951.

In the use of light sources for photographic purposes, such as flood lamps or spotlights employed in studios, it is highly desirable that a uniform color temperature of the light source be maintained. Thus, for taking black and white pictures, as in moving picture work, it is desirable that the relative percentages of the various color components of the light, which include both the actinic and visible rays, remain constant so that the proper light exposure and color balance can be determined and reproduced for subsequent scenes at a later date to insure that correct exposure is obtained. In black and white photography different colors should come out as different variations of gray, so that if a light source should be used which is weak in the blue and strong in the red, a different effect would be obtained from that where the light source was strong in the blue and weak in the red portions of the spectrum. If a light source is used which changes over a period of time in its color temperature, then the values on the film will change.

In color photography correct rendition of the colors is the prime objective; they should look the same on the film as they do to the eye. If a light source is used which is weak in the blue portion of the spectrum, then the blues will appear darker than they should since we photograph by reflected light. So it is important that the color temperature of the light source used in taking and projecting colored photographs be known and remain constant; it is for that reason that each type of color film is specified to be used with a light of a given color temperature.

In motion picture photography heretofore tungsten flood lamps have generally been used, but these lamps are subject to serious disadvantages. They have a very short useful life, usually about ten hours, and their color temperature changes continuously during the entire period of their life, and it is very difficult to maintain the color temperature constant by means of filters or by changing the current flowing through the tungsten filament. Also, if it is desired to vary the intensity of the illumination on a scene to obtain a desired effect in the film, for example, as from simulated daylight scenes to twilight scenes, it is necessary with tungsten lamps either to move the light source towards or away from the scene or to put non-selective light filters such as wire mesh over the lamp. This is highly inconvenient, but the intensity of a tungsten lamp can not be changed by changing the value of the current flowing in its circuit since this also changes the color temperature of the lamp. With a lamp in accordance with the instant invention the current flowing through the lamp may be varied to any desired extent and hence any desired degree of light intensity may be obtained, without materially changing the color temperature of the lamp. This is because when the current flowing through the lamp is varied, all that happens is that the size of the total light emissive area, and hence the quantity of light output, is changed. Moreover, a lamp in accordance with this invention has a useful life which is many times longer than the life of a tungsten lamp of comparable size; life tests have shown that a 1 kilowatt lamp of the character disclosed herein may be expected to have a useful life of 1000 hours or longer, which is of the order of one hundred times greater than the useful life of a tungsten filament lamp of the same size used for photographic lighting purposes.

In practice, the cathode in a concentrated arc discharge lamp of the character described is formed from a rod or tube of suitable material, such as molybdenum, into which is packed a suitable cathode material, for example, zirconium oxide or hafnium oxide, and heretofore the anode generally has comprised a sheet of a suitable metal such as molybdenum, having either a central apertured portion or an outer edge portion on which the positive end of the arc terminates. This construction has proved adequate and satisfactory in these lamps in sizes from 2 to 100 watts, but in lamp sizes larger than 100 watts the anode or plate structure may become overheated and vaporized to some extent, thus impairing the efficiency and reducing the life of the lamp.

The use of either water-cooled anodes or cooling fins to avoid overheating undesirably complicates the construction, manufacture and operation of the lamps and moreover appreciably increases their cost, and in the device of my aforesaid Patent No. 2,543,227 a special anode construction is employed having a wire coil surrounding the anode structure and through which the current comprising the arc stream of the lamp is passed in order to set up a magnetic field in a direction to induce rapid rotation of the arc over the surface of the anode and about the cathode surface, thereby to prevent localization of heating of the anode. Such a structure is suitable for use in larger size lamps, for example, up to 5 kilowatts, but the considerable heat evolved by the anode structure, and which must be dissipated in a lamp of such construction, represents a loss in efficiency since the heat given off by the anode structure performs no useful function. In accordance with the present invention, the energy loss formerly dissipated as heat at the anode structure is obviated and instead this heat is utilized for producing light when the lamp is connected to a source of alternating current power.

One of the objects of the present invention is to provide a concentrated arc lamp suitable for use with an alternating current source of power supply, and in which the quantity of light emitted for a given power input is greatly increased.

An additional object is a concentrated arc lamp adapted to be used with an alternating current source of power supply and which is especially suitable for photographic illumination purposes, and in which the electrode structure utilizes a much greater proportion of the power input to produce light than theretofore possible with a concentrated arc lamp.

Another object is a concentrated arc lamp which has approximately twice the light producing efficiency of concentrated arc lamps heretofore devised, and which will provide approximately twice as much light for a given power input.

Another object is a concentrated arc lamp of the character described which may be made in large sizes and in which the electrode structure does not become overheated, notwithstanding that currents of large values are passed through the lamp.

A further object is an alternating-current powered lamp in which the intensity of its illumination may be varied by varying the current flowing through the lamp without substantially changing its color temperature.

Additional objects are a concentrated arc lamp in which any volatilization of the material of one electrode and transfer of the volatilized material to the other electrode will not poison or otherwise detrimentally affect said other electrode, and to provide a more efficient electrode structure in concentrated arc lamps and particularly in such lamps of the larger sizes.

Other objects and advantages will be apparent from the following detailed description of two illustrative embodiments of the invention, taken in connection with the accompanying drawings, in which:

Fig. 1 is a front view, in elevation, of a one-kilowatt concentrated arc lamp constructed in accordance with the invention;

Fig. 2 is a sectional view, taken along the line 2—2 of Fig. 1;

Fig. 3 is a diagrammatic representation of the path of the arc stream in the lamp of Figs. 1 and 2;

Figure 4:
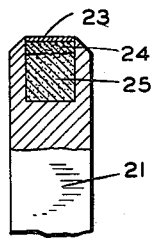
Figure 5:
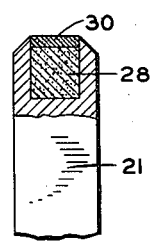
Figure 6:
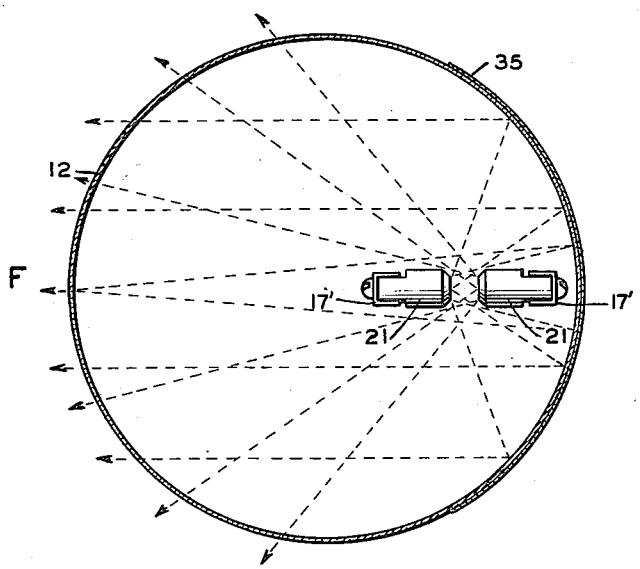

Figs. 4 and 5 respectively are detail views of different forms of electrode structures for the lamp;

Fig. 6 is a plan view of a modified form of the lamp; and

Figure 7:
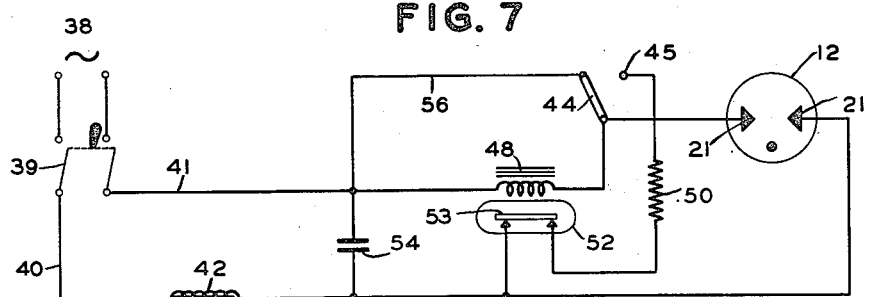

Fig. 7 shows a suitable power supply circuit for operating the lamp from a source of alternating current power supply.

Referring particularly to Figs. 1 to 5 of the drawings, the embodiment there illustrated comprises a sealed envelope 12 composed of a glass, quartz or other suitable heat-resistant transparent material. The lamp terminals may comprise copper thimbles 14 of the type disclosed in Kruh et al. Patent 1,564,690, issued December 8, 1925. Each thimble has a ring 15 of glass sealed to both the inner and outer edges of the rim of the thimble which tapers down to a thin edge as in Houskeeper Patent 1,294,466, issued February 18, 1919, or Kirwer Patent 1,716,140, issued June 4, 1929. The base or terminal part 12a, Fig. 1, of the lamp may be made as a separate glass body and the electrode structure mounted directly thereon, after which the glass body is sealed to the neck of the envelope proper.

Received within and supported by the thimbles 14 are lead-in posts 16 of molybdenum or other suitable metal, which posts at their lower ends are silver-soldered to the thimbles 14. Secured to the upper ends of the post 16, as by machine screws or bolts, are channel-shaped upright metal members 17 which preferably are of molybdenum.

At the upper ends of the two channel members 17 are the two electrodes 21 of the lamp, which electrodes may be identical in construction if desired, and preferably are in the form of short rods or pencils. The electrodes are carried by the upper ends of their respective channel members by machine screws 20, Fig. 2, which also serve to electrically connect the electrodes to the channel members. In the embodiment shown in Figs. 1 and 2, the electrodes are mounted so that their longitudinal axes are at an angle to each other, thereby to provide a clear field for light emission, the light being emitted from the front ends 23 which comprise active fused surface films hereinbelow described.

Fig. 4 is a fragmentary view of one of the electrodes 21, which is formed from a rod of tantalum, molybdenum or like metal having high melting and volatilization point temperatures. In the end of the rod 21 a hole has been drilled which extends inwardly a distance of approximately three-eighths of an inch, and this hole is filled with an electron emissive material which is inserted and treated in a manner hereinafter disclosed so as to form the electrode. The filling material, when properly treated or activated, has the characteristic of being a good electron emissive substance at very high temperatures only; as disclosed in my aforesaid Buckingham et al. Patent 2,453,118, an important characteristic of a substance which will give optimum results is that it is not a sufficiently good electron emitter at lower temperatures to cause electrons to be emitted in sufficient quantity to support an arc of high current density until the material, or at least the surface 23 thereof, has reached incandescent temperatures, well above the melting point of the base metal of which the substance is composed. Preferably, zirconium oxide or hafnium oxide is employed as the electrode material. Either of these oxides or a mixture thereof, in the form of oxide powder, is packed into the hole in each of the electrode pencils 21. After the hole has been filled to the top thereof with the oxide powder, each electrode is preheated in a high vacuum in an oven to approximately 3600° F. to drive off moisture and any volatile material and occluded gases. Each electrode then is separately formed by inserting the same within a bell jar or glass vessel. Within the bell jar in which the electrode 21 temporarily is inserted for the forming operation there is provided an anode which may either be of conventional plate construction such as the anode disclosed in my aforesaid Patent 2,453,118, or a special plate construction such as disclosed in my aforesaid Patent No. 2,543,227. The bell jar, with the anode and electrode therein, is connected to a vacuum pump and evacuated to as high degree as practicable, for example, evacuated down to a fraction of a micron of mercury pressure. The bell jar then is filled with a suitable gas or vapor which is inert with respect to the material of the electrode, such as neon, argon, krypton and the like. Argon is preferred because it enables a low starting voltage to be employed during the forming operation. The gas pressure in the bell jar preferably is of the order of one atmosphere during forming of the electrode.

The electrode is activated or formed while within the bell jar by connecting the anode to the positive pole and the electrode to the negative pole of a suitable source of direct current of adjustable potential; for example, so that potentials up to 1000 volts may be obtained. In one side of the forming circuit is connected a variable resistance so that the resistance of the circuit may progressively be reduced. Starting with a high value of resistance in the circuit the voltage is gradually increased until an arc discharge appears, the arc striking between the anode and the end 23 of the electrode. After a few seconds the electrode tube 21 becomes red hot and heats the oxide packed in it to a temperature where the oxide becomes electrically conducting. The arc then strikes between the anode and the oxide and raises the temperature of the surface 23 of the oxide to or above its melting point, so that the molten oxide on the surface flows and bonds itself to the sides of the metal tube 21, forming a smooth glassy surface on the end of the electrode material.

Under the intense ionic bombardment of the arc some of the oxide in molten state is reduced or decomposed to metallic zirconium or hafnium depending upon which oxide, zirconium or hafnium, was packed in the electrode pencil, forming a very thin layer of such metal over the active end surface of the electrode 21. Either zirconium metal or hafnium metal is a better electron emitter at high temperatures than is its oxide, and it also has a lower melting temperature; thus as soon as the metallic zirconium or hafnium surface layer is formed, the temperature of the cathode drops slightly and the underlying oxide solidifies and supports the film of molten metal on its surface.

Two electrodes 21 thus treated, comprising the electrode assembly in a lamp, are then inserted in the envelope 12 of the lamp and sealed therein in the manner hereinbefore described. The envelope 12 is then connected to a vacuum pump and heated in an oven to a temperature of approximately 900° F., which heating is effected while the envelope is evacuated to as high degree as practicable. The envelope and assembly are removed from the oven while maintaining the high vacuum thereon, and the envelope is filled with a suitable gas or vapor, such as one of the gases employed in the forming operation. Argon is preferred in the completed lamp because it operates exceedingly well in the lamp, and as above stated, enables a low starting voltage to be employed. The gas pressure in the envelope 12 preferably is of the order of one atmosphere when the lamp is in operation.

The film of molten metal which was formed on each of the electrodes 21 during the forming operation appears to be the chief source of the visible radiation from the lamp. The films, once initially formed as above set forth, remain to be heated and to become incandescent whenever the lamp is relighted. Each film is so thin that apparently surface tension holds it to its oxide backing so that the lamp may be burned in any position. The film 23 of Fig. 4 is supported by the semi-fused layer of oxide 24 immediately beneath, and this layer merges into the white powder 25 of the original oxide. The oxide powder 25, and also to some extent the semi-fused layer 24, thermally insulates the active surface layer 23 to the extent that it reaches a temperature which is much higher than the melting point of the metal of which the oxide is composed. For a one-kilowatt size lamp of the form illustrated, the outside diameter of each electrode pencil 21 is approximately ½"; the inside diameter of the aperture is approximately 5/16"; and the diameter of each of the active spots or incandescent films 23 is approximately 9/32"; as above stated the filling is approximately 3/8" deep. The spacing between the adjacent portions of the active ends of the electrodes is approximately ¼".

Hafnium oxide produces in certain respects a better light than does zirconium oxide, but it costs considerably more than zirconium oxide. Therefore, as shown in Fig. 5, the hole in the electrode pencil 21 may be largely filled with a mass 28 of a material, such as magnesium oxide, which tends to thermally insulate the hafnium oxide. On top of the magnesium oxide is packed a mass of hafnium oxide as indicated at 30, which mass need be only 1/16" to 1/8" thick. It will be understood that the hafnium oxide mass 30 embodies three different layers, namely, a surface film of hafnium metal, an underlying semi-fused hafnium oxide layer and the powdered hafnium oxide layer, generally in the manner of the zirconium and zirconium oxide layers shown in Fig. 4.

In concentrated arc lamps of prior types employing an anode or plate, and operated from direct current, the anode serves to locate and fix the positive end of the arc stream and therefore must dissipate the heat released there without getting hot enough to vaporize or to produce any considerable radiation due to its own incandescence, even at the point where the arc stream strikes. If any part of such an anode becomes hot enough to vaporize, the vapor so released will migrate to the cathode and in time spoil the lamp. With a one-kilowatt lamp, and a voltage drop of approximately 20 volts across the lamp, the current flowing in the arc stream is approximately 50 amperes when the lamp is powered from a 110 volt source. This relatively large current tends to heat the anode and cause vaporization of a portion of the anode. The arrangement disclosed herein, however, obviates the possibility of impairing the efficiency and life of the lamp due to vaporization of the molybdenum or other metal heretofore employed in the anode plate structures of concentrated arc lamps. Any transfer of active material, either zirconium or hafnium, from one electrode 21 to the other does not impair the efficiency of the lamp of the instant invention, and any such transfer effect is reversible since the lamp is powered from alternating current and each of the electrodes successively operates as anode and cathode, so that the surfaces of the two electrodes remain similar both in composition and in the quantity of active material at the light emitting surfaces.

In order to overcome the tendency of the arc flame to project outwardly too far from the active surfaces 23 of the electrodes, which would tend to overheat the adjacent portion of the wall of the envelope 12, a magnet 32, Figs. 1 and 2, may be positioned in any suitable manner (not shown) outside the envelope to set up a magnetic field between the electrodes with lines of force extending in a direction generally perpendicular to the active surfaces 23. These magnetic lines of force will prevent the arc flame from projecting outwardly, and instead will cause the arc to be projected upwardly and downwardly respectively in successive half cycles of the alternating current, in the manner diagrammatically indicated by the dotted circle 33 in Fig. 3. The arc stream will travel in a continuous circular path, for example, in a clockwise direction as indicated by the arrows, notwithstanding that alternating current is supplied to the electrodes. The direction of rotation will depend upon how the magnet is poled relative to the electrodes, but either direction will suffice. An electromagnet may, of course, be employed instead of the permanent magnet illustrated. During operation of the lamp the active material on the surface portions of the electrodes may tend to pile up at one edge of each of the electrodes so that their faces tend to approach parallelism with each other. With the arc stream forced upwardly and downwardly in successive half cycles, as indicated in Fig. 3, the tendency of the active surface material to pile up at an edge of either of the cathodes is obviated. The rotation of the arc stream has three important advantages: (1) it prevents localization of heating of the electrodes, i. e., it distributes the heat over the electrode surfaces so that they do not overheat at any point; (2) it distributes the heat and hence the radiation of light more uniformly over the active portions of the electrode surfaces because it also rotates about each electrode surface; and (3) it controls the arc flame which would tend to shoot out in front of the electrodes, with the likelihood of softening or melting the glass envelope, if it were not for the magnetic field produced by the magnet 32.

In an electrode structure for a five kilowatt lamp the outside diameter of each of the electrode pencils 21 is approximately ¾"; the inside diameter of the aperture is .55", and the active spot will almost fill this aperture. The adjacent portions of the active ends of the electrodes may be spaced ¼" or slightly farther apart, and approximately 250 amperes will flow through the lamp when connected to a 110 volt alternating current supply.

For flood lighting and general photographic and illumination purposes it is not generally essential that the light emanate from a single source, and hence the two closely spaced sources in the lamp disclosed herein introduces no objectionable feature in this respect. The use of alternating current enables much simpler power supply apparatus to be used since it is not necessary to have a rectifier device in the circuit. The heat remaining in each electrode during every other half cycle of the power supply when the electrode is operating as an anode, causes the active surface of the electrode to remain at substantially the temperature that it reaches when the electrode is operating as a cathode, and thus the electrodes coact to produce one and one-half to two times the amount of light that would be produced by a single cathode of the same construction when used with an anode and powered from direct current. The heat generated in an anode of the prior concentrated arc lamp structures, and which must be dissipated, represents a considerable loss of input energy, which loss is largely obviated in the instant lamp.

As hereinbefore stated, the lamp will produce and maintain a color temperature of approximately 3200° Kelvin throughout along useful life, and the current flowing through the lamp may be varied to any desired extent and hence any desired degree of light intensity may be obtained, without materially changing the color temperature of the lamp, since variation in the current flowing through the lamp merely changes the size of each spot of light and thus changes the quantity of the light output. The operating temperature of the lamp, as nearly as can be determined, is approximately 3000° C. when zirconium oxide is used as the electrode material, and is approximately 3200° C. when hafnium oxide is employed.

Fig. 6 shows a modification in which the envelope 12 has a coating of silver or other suitable light reflecting material applied to a portion of the outer surface of the envelope, and the electrodes 21 are supported in alignment with each other by channel members 17', the active light emitting surfaces being substantially parallel to each other. This avoids the tendency of the active material to pile up on one edge of each of the emitting surfaces. The light from the left hand electrode, as viewed in the figure, is reflected through the front window F of the lamp by the silvered sufrace 35, whereas the light from the right hand electrode will directly pass to the front of the lamp, as indicated by the dotted lines. The position of the electrodes relative to the reflector surface is such that the reflected light will have the desired pattern, this position also being determined by the curvature of the silvered wall portion 35. The envelope may be silvered on its inner wall, if desired, and in lieu of a reflecting coating on the wall of the lamp a reflector outside and spaced from the lamp envelope may be employed.

Fig. 7 shows a suitable starting and running circuit for the lamp when it is operated from a source of alternating current supply 38. A ballast impedance 42, preferably an inductance, is inserted in one side of the circuit since the lamp has a negative-volt-ampere characteristic. With the main switch 39 closed, and switch 44 thrown to the contact 45, which is the starting position, current will flow over a circuit comprising conductor 41, winding 48 of a vacuum switch 52, manually operable switch 44, contact 45, impedance 50, armature 53 and contacts of the vacuum switch 52, and the ballast impedance 42 and conductor 40. The vacuum switch 52 is of the type in which the circuit is made and broken between solid contacts in a vacuum in response to the magnetic field set up by inductance 48, such a switch having been found to be unusually effective to provide the surge required in starting vapor arc lamps. Various kinds of such switches are well known; one suitable for the purpose is disclosed in the Ruth Patent No. 2,076,162, issued April 6, 1937, and also in the Buckingham et al. Patent No. 2,564,877, issued August 21, 1951. The inductance coil 48 has an open air gap and hence a magnetic field which attracts the magnetizable bar or armature 53 of the switch 52, opening the circuit formerly through the switch contacts and interrupting the current. When the current is interrupted, an inductive pulse generated across the inductance 48 breaks down the arc gap in the lamp, and the lamp becomes operative. The condenser 54 readily permits the voltage surge to pass to one of the electrodes 21 of the lamp. The lamp current flowing through inductance 48 holds the armature 53 of the switch in the open position, and switch 44 can then be thrown to the operating position, i. e., to the left as viewed in Fig. 7, thereby shunting out the inductor 48. Various other suitable starting and running circuits for the concentrated arc lamp may, of course, be employed in lieu of the illustrative circuit shown in Fig. 7.

While there are shown and described herein two illustrative embodiments of the invention, many other and varied forms of the lamp and of the electrode structure per se, and also other uses for the lamp, will present themselves to those versed in the art without departing from the invention which is, therefore, not limited either in structure or in use except as indicated by the scope of the appended claims.

I claim:

1. A concentrated arc discharge lamp of the character in which the light is emitted principally by highly incandescent surfaces of the electrodes and to a lesser extent by the cathode glow portion of the discharge, and which is adapted to be energized by alternating current power supply, comprising a sealed light-transmissive envelope enclosing two electrode structures and an ionizable gas filling having a pressure of approximately one atmosphere at the operating temperature of the lamp, said electrode structures each being successively operative as an anode and a cathode during successive half cycles of said alternating current power supply, each of the electrode structures comprising a metallic body having a hole therein and a core embedded in said hole, said core extending substantially to the surface of the metallic body and having an exposed surface portion forming the active light-emitting surface area of the electrode, said core at the active surface portion thereof consisting essentially of a layer of a metal of the class consisting of zirconium and hafnium and bonded to said metallic body, said layer being supported by an underlying coalescent mass consisting essentially of an oxide of the metal of said layer.

2. A concentrated arc discharge lamp according to claim 1, having means for supporting the electrode structures at a converging angle to expose more clearly their active light-emitting surfaces.

3. A concentrated arc discharge lamp according to claim 1, having means for producing a magnetic field in a direction to cause the arc stream to rotate laterally in a continuous circular path over said active light-emitting surfaces.

4. A concentrated arc discharge lamp according to claim 1, having means for producing a magnetic field extending in a direction to force the arc laterally in opposite directions respectively in successive half cycles of the alternating current power supply and prevent the active surface portion of each of the electrodes from building up at an edge thereof due to the relative angular positions of the electrodes.

WILLIAM D. BUCKINGHAM.

References Cited in the file of this patent

UNITED STATES PATENTS

| Number | Name | Date |
| --- | --- | --- |
| 1,596,747 | Lorenz | Aug. 17, 1926 |
| 1,747,225 | Case | Feb. 18, 1930 |
| 1,814,851 | Prince | July 14, 1931 |
| 1,914,762 | Thomas | June 20, 1933 |
| 1,925,701 | Meyer | Sept. 5, 1933 |
| 2,031,927 | Braselton | Feb. 25, 1936 |
| 2,246,131 | Gooskens | June 17, 1941 |
| 2,249,672 | Spanner | July 15, 1941 |
| 2,251,046 | Gaidies | July 29, 1941 |
| 2,367,579 | Henry | Jan. 16, 1945 |
| 2,453,118 | Buckingham et al. | Nov. 9, 1948 |